(12) United States Patent
Wallach

(10) Patent No.: US 11,934,836 B2
(45) Date of Patent: Mar. 19, 2024

(54) SHADOW CACHE FOR SECURING CONDITIONAL SPECULATIVE INSTRUCTION EXECUTION

(71) Applicant: Micron Technology, Inc., Boise, ID (US)

(72) Inventor: Steven Jeffrey Wallach, Dallas, TX (US)

(73) Assignee: Lodestar Licensing Group LLC, Evanston, IL (US)

( * ) Notice: Subject to any disclaimer, the term of this patent is extended or adjusted under 35 U.S.C. 154(b) by 0 days.

(21) Appl. No.: 17/888,410

(22) Filed: Aug. 15, 2022

(65) Prior Publication Data

US 2022/0391212 A1 Dec. 8, 2022

Related U.S. Application Data

(63) Continuation of application No. 17/189,151, filed on Mar. 1, 2021, now Pat. No. 11,422,820, which is a continuation of application No. 16/028,930, filed on Jul. 6, 2018, now Pat. No. 10,949,210.

(60) Provisional application No. 62/665,803, filed on May 2, 2018.

(51) Int. Cl.
*G06F 9/38* (2018.01)
*G06F 12/0875* (2016.01)
*G06F 12/0891* (2016.01)

(52) U.S. Cl.
CPC ........ *G06F 9/3844* (2013.01); *G06F 12/0875* (2013.01); *G06F 12/0891* (2013.01); *G06F 2212/1032* (2013.01); *G06F 2212/452* (2013.01)

(58) Field of Classification Search
None
See application file for complete search history.

(56) References Cited

U.S. PATENT DOCUMENTS

| 5,671,444 | A | * | 9/1997 | Akkary | G06F 12/0859 |
| | | | | | 711/E12.051 |
| 5,838,943 | A | | 11/1998 | Ramagopal et al. | |
| 6,321,328 | B1 | | 11/2001 | Karp et al. | |
| 7,277,989 | B2 | | 10/2007 | Chaudhry et al. | |
| 7,490,229 | B2 | * | 2/2009 | Tremblay | G06F 9/30105 |
| | | | | | 712/239 |
| 7,496,732 | B2 | | 2/2009 | Kottapalli et al. | |
| 8,024,522 | B1 | | 9/2011 | Favor et al. | |
| 8,370,609 | B1 | | 2/2013 | Favor et al. | |
| 8,943,273 | B1 | | 1/2015 | Jamil et al. | |
| 9,507,647 | B2 | * | 11/2016 | Blumrich | G06F 12/084 |
| 10,949,210 | B2 | | 3/2021 | Wallach | |
| 11,422,820 | B2 | | 8/2022 | Wallach | |

(Continued)

OTHER PUBLICATIONS

Shadow Cache for Securing Conditional Speculative Instruction Execution, U.S. Appl. No. 16/028,930, filed Jul. 6, 2018, Steven Wallach, Patented Case, Jul. 8, 2020

(Continued)

*Primary Examiner* — Michael Sun
(74) *Attorney, Agent, or Firm* — Greenberg Traurig

(57) ABSTRACT

A computing device, having: a processor; memory; a first cache coupled between the memory and the processor; and a second cache coupled between the memory and the processor. During speculative execution of one or more instructions, effects of the speculative execution are contained within the second cache.

20 Claims, 5 Drawing Sheets

(56) References Cited

U.S. PATENT DOCUMENTS

| | | |
|---|---|---|
| 2004/0006672 A1* | 1/2004 | Civlin .................. G06F 12/0891 |
| | | 711/E12.04 |
| 2005/0154805 A1 | 7/2005 | Steely, Jr. et al. |
| 2006/0161740 A1 | 7/2006 | Kottapalli et al. |
| 2015/0242307 A1 | 8/2015 | Busaba et al. |
| 2016/0246723 A1 | 8/2016 | Doshi et al. |
| 2017/0262287 A1 | 9/2017 | Abdallah |
| 2019/0339975 A1 | 11/2019 | Wallach |
| 2019/0339978 A1 | 11/2019 | Wallach |
| 2021/0056043 A1 | 2/2021 | Grisenthwaite |
| 2021/0208892 A1 | 7/2021 | Wallach |

OTHER PUBLICATIONS

Shadow Cache for Securing Conditional Speculative Instruction Execution, U.S. Appl. No. 17/189,151, filed Mar. 1, 2021, Steven Wallach, Patented Case, Oct. 15, 2021.

\* cited by examiner

SHADOW CACHE FOR SECURING CONDITIONAL SPECULATIVE INSTRUCTION EXECUTION

RELATED APPLICATIONS

The present application is a continuation application of U.S. patent application Ser. No. 17/189,151, filed Mar. 1, 2021 and issued as U.S. Pat. No. 11,422,820 on Aug. 23, 2022, which is a continuation application of U.S. patent application Ser. No. 16/028,930, filed Jul. 6, 2018 and issued as U.S. Pat. No. 10,949,210 on Mar. 16, 2021, which claims the benefit of the filing date of Prov. U.S. Pat. App. Ser. No. 62/665,803, filed May 2, 2018 and entitled "Shadow Cache for Securing Conditional Speculative Instruction Execution," the entire disclosures of which applications are hereby incorporated herein by reference.

FIELD OF THE TECHNOLOGY

At least some embodiments disclosed herein relate generally to computer architecture and more specifically, but not limited to, conditional speculative instruction execution in computer processors.

BACKGROUND

A memory address in a computing system identifies a memory location in the computing system. Memory addresses are fixed-length sequences of digits conventionally displayed and manipulated as unsigned integers. The length of the sequences of digits or bits can be considered the width of the memory addresses. Memory addresses can be used in certain structures of central processing units (CPUs), such as instruction pointers (or program counters) and memory address registers. The size or width of such structures of a CPU typically determines the length of memory addresses used in such a CPU.

Speculative execution is a computing technique where a processor executes one or more instructions based on the speculation that such instructions need to be executed under some conditions, before the determination result is available as to whether such instructions should be executed or not. Speculative execution can lead to security vulnerabilities, such as Meltdown and Spectre that were made public in 2018.

BRIEF DESCRIPTION OF THE DRAWINGS

The embodiments are illustrated by way of example and not limitation in the figures of the accompanying drawings in which like references indicate similar elements.

DETAILED DESCRIPTION

The present disclosure includes the techniques of using a shadow cache to contain and isolate the effects of speculative execution of instructions. The results in the shadow cache are incorporated into the main cache after the execution of the instructions is determined to be required. The results in the shadow cache are discarded if it is determined that the actual execution path does not involve the speculated execution of the instructions. Isolation of the effects of speculative execution in a shadow cache can prevent security attacks that are based on the availability of the effects of speculative execution in the main cache.

The present disclosure also includes the techniques of using static object identification numbers in addresses of a predetermined width (e.g., 128-bit) for an instruction set (e.g., 128-bit instructions) to represent certain types of objects, such as kernel objects, objects using addresses of a smaller width (e.g., 64-bit, 32-bit) that are generated and/or used by other instruction sets (e.g., 64-bit instructions, 32-bit instructions), etc. In general, the addresses of the predetermined width (e.g., 128-bit) can be generated using various instruction sets (e.g., 128-bit instructions, 64-bit instructions, 32-bit instructions) in various processors that can use such instruction sets to generate and/or use addresses of the predetermined width (e.g., 128-bit). Thus, the predetermined width (e.g., 128-bit) is not limited to a particular type of instruction sets and/or instructions of a particular width.

The present disclosure further includes the techniques of using object identification numbers in memory addresses to secure conditional speculative instruction execution. For example, when a static object identification number of a memory address identifies a kernel object of an operating system, a processor can avoid speculative execution into the kernel object and thus increase the security of the computing system and prevent potential security threats that attack the kernel of the operating system via speculative execution. For example, when the object identification number of a memory address associated with a subsequent instruction to be executed on speculation is different from the object identification number associated with a prior instruction executed before the subsequent instruction, the processor can abort the attempt to perform speculative execution of the subsequent instruction for improved security.

Figure 1:
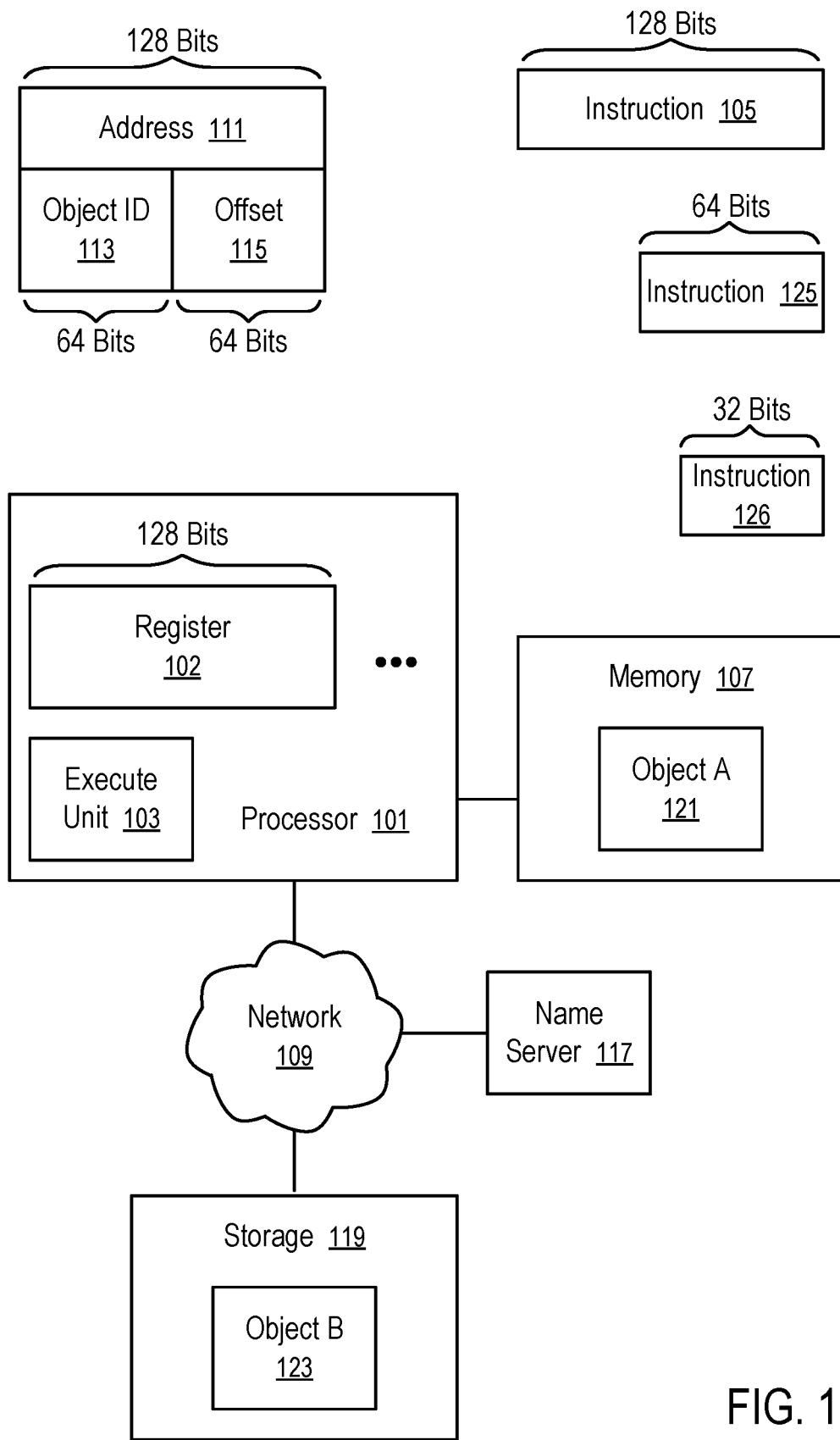
FIG. 1 shows a computer system using an address system according to one embodiment.

FIG. 1 shows a computer system using an address system according to one embodiment.

In FIG. 1, a processor (101) (e.g., a microprocessor or CPU) has an execution unit (103) to perform operations of instructions (e.g., 105) programmed according to one or more instruction sets that can generate 128-bit virtual memory addresses (e.g., 128-bit instruction set).

An example of the 128-bit instruction set is RV128 of RISC-V instruction set identified by the RISC-V Foundation.

The processor (101) is configured with registers (e.g., 102) of a predetermined width, such as 128 bits. The processor (101) can fetch an instruction (105) of the predetermined width, and use an execution unit (103) to perform operations on data provided in the instruction (105) and/or data provided in one or more registers (e.g., 102) identified in the instruction (105), and when applicable, store the result of the operations identified by the instruction (105) in a register identified in the instruction (105).

The registers (e.g., 102) can include a memory register of the predetermined width (e.g., 128 bits) and/or an instruction pointer (or program counter) of the predetermined width (e.g., 128 bits).

For example, an instruction can be coded according to the predetermined specification of an instruction set to perform integer computation (e.g., add, or, xor), to perform control transfer (e.g., jump, branch), to load data/instructions from memory at a memory location specified using an address (e.g., 111) of the predetermined width, or to store data at a memory location specified using an address (e.g., 111) of the predetermined width (e.g., 128 bits).

For example, the address (111) can be used to identify a memory location storing an instruction in the computer system; and the address (111) can be placed in an instruction pointer (or program counter) to identify the instruction to be executed by the processor (101).

For example, the address (111) can be used to identify a memory location storing a data item in the computer system; and the address (111) can be placed in a memory register to identify the data to be operated upon by the processor (101) in executing an instruction.

Typically, a 128-bit instruction set can address a 128-bit address space. Similarly, a 64-bit instruction set can address a 64-bit address space; and a 32-bit instruction set can address a 32-bit address space.

In some instances, a 64-bit instruction (e.g., 125) (or a 32-bit instruction (e.g., 126)) can also generate and/or use a 128-bit address (e.g., 111). For example, when a 128-bit address is stored in an address register (e.g., 102), the 64-bit instruction (125) (or a 32-bit instruction (126)) executed in the processor (101) (and/or another processor) can operate upon or use the 128-bit address (111) and/or generate another 128-bit address. Thus, the width of memory addresses is not necessarily limited by the width of instructions that generate or use the memory addresses.

In the computer system illustrated in FIG. 1, a 128-bit address (111) is configured to include two portions: a 64-bit object ID (113) and a 64-bit offset (115) relative to the object identified by the object ID (113). For example, the offset (115) can be a byte offset.

The 64-bit offset (115) can be used for indexing, such as program counter, stack pointer, for loading data and/or instruction from a memory location or for storing data at the location. The memory location can be in a main memory (107) connected to the processor (101) via one communication channel (e.g., a memory bus), or a storage (119) connected to the processor via another communication channel (e.g., over a network 109).

FIG. 1 illustrates an example structure for a 128-bit address. Other size choices can be implemented to have the structure of an object ID (113) and an offset (113) relative to the object identified by the object ID. For example, the width of the address can be different from 128 bits. For example, the object ID (113) and the offset (115) can be configured to have different numbers of bits.

In general, the 128-bit address system illustrated in FIG. 1 can be configured to be independent from instruction set architecture such that different vendors of different processors (e.g., 103) having different instruction sets can use the same address system. The memory access request made using the address (128) can be routed in a computer system over memory buses, input/output buses, and/or network (109) like routing internet protocol (IP) packets. Preferably, the association between a memory/storage location and the address (111) is persistent across time and space.

In response to an instruction (105, 125 or 126), the processor (101) can access a data item identified by the 128-bit memory address (111) stored in a register (102). The object ID (113) of the address (111) is usable to identify an object having a distinct name. Such an object can be a software or hardware structure with a name controlled, allocated, issued, and/or registered by a centralized name server (117). The name server (117) can be coupled to the processor (101) via a computer network (109); and the object (e.g., 121 or 123) represented by the object ID (113) can be in the memory (107) that is coupled to the processor (101) via a memory bus, or in a storage (119) that is coupled to the processor (101) via the network (109), or in memory coupled to another processor on the network (109).

An object identified by an object ID (113) in the address (111) can be used to specify location and protection mechanisms, language specific/architecture attributes, such as partitioned global address space (PGAS) node, data encrypted, and/or blockchain.

The object ID (113) of the corresponding object (121 or 123) can be created or allocated using the name server (117) for the entire computer system connected by the network (109), which can include the Internet.

Preferably, the address space using addresses (e.g., 111) in the format illustrated in FIG. 1 is unique over time and space. Any computer supporting the address space is addressable on the network (109) by the name server (117).

When a processor (101) is accessing an object for the first time, the access can require verification of permission to access (e.g., download an executable file, access an entry in an Access Control List (ACL)), and verification of access privileges for the object (e.g., read, write, execute, access through a protected sub-object, execution domain). Execution domain can be identified via classifications of the levels of users (e.g., gold, platinum, executive platinum) and admin level (e.g., 1, 2, . . . , n).

Figure 2:
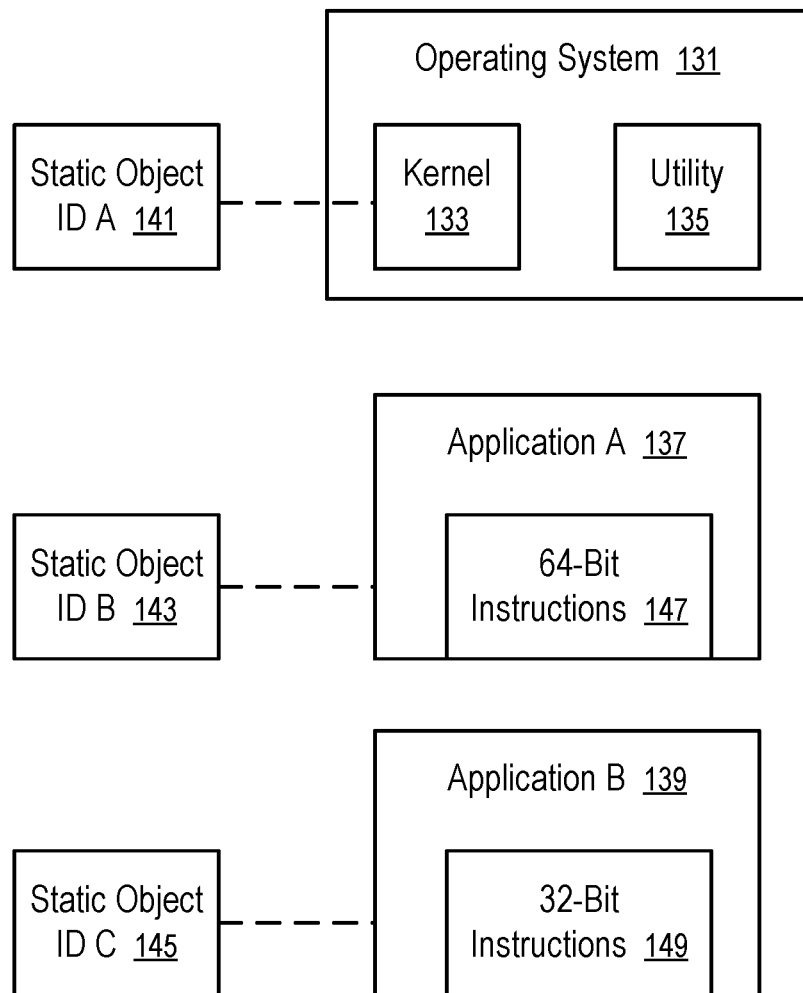
FIG. 2 shows static object identifications in an address system of FIG. 1.

Certain static object IDs can be used to identify predetermined object types or object spaces, as illustrated in FIG. 2.

FIG. 2 shows static object identifications in an address system of FIG. 1.

For example, an object ID (141) having a predetermined value of zero (0) can be used to identify any kernel object (133) of an operating system (131); and the object ID (141) can be static for kernel objects (e.g., 133) across all the nodes in the computer system, regardless of the location of the kernel object (133) in the computer system. The operating system (131) can have utilities (e.g., 135) are not part of the kernel (133).

For example, an object ID (143) having a predetermined value of one (1) can be used to identify any object of an application (137) programmed using 64-bit instructions (143); and the object ID (143) can be static for 64-bit instruction objects (e.g., 137) across all the nodes in the computer system, regardless of the location of the 64-bit instruction object (137) in the computer system.

For example, an object ID (145) having a predetermined value of two (2) can be used to identify any object of an application (139) programmed using 32-bit instructions (147); and the object ID (145) can be static for 32-bit instruction objects (e.g., 139) across all the nodes in the computer system, regardless of the location of the 32-bit instruction object (139) in the computer system.

The static object IDs (141, 143, and/or 145) provide predetermined information about the objects accessed via the memory addresses (e.g., 111) having the static object IDs (141, 143, and/or 145).

For example, when the processor (101) accesses a memory location using the address (111) where the object ID (113) is the static object ID (141), the processor (101) can determine that the data or instruction stored in the memory location is for a kernel object (133) of an operating system (131). Thus, the processor (101) can adjust its operations (e.g., priority level, security level) based on the information that the accessed memory is for an operating system kernel (133).

Similarly, when the processor (101) accesses a memory location using the address (111) where the object ID (113) is the static object ID (143 or 145), the processor (101) can determine that the data or instruction stored in the memory location is for a 64-bit application (137) or a 32-bit application (139). Thus, the processor (101) can adjust its operations to optimize performances, priority and/or security for the application.

In general, static object IDs (e.g., 141, 143, and/or 145) can be used to provide the processor (101) with predetermined information about the objects referenced by the memory address (111) containing the static object IDs (e.g., 141, 143, and/or 145), without a need to contact the name server (117) to look up the property of the objects (e.g., 121 or 123). Thus, the computer system and/or the processor (101) can use the predetermined information in efficiently processing the data and/or instruction fetched using the address (111) that contains the static object IDs (e.g., 141, 143, or 145). For example, a static ID can be used to identify a partitioned global address space (PGAS) address of a predetermined width (e.g., 128-bit or 64 bit), a version of internet protocol addresses (e.g., Internet Protocol version 6 (IPv6)), a unique ID, etc. For example, a static ID can be used to indicate whether the object is a user object, a kernel object of an operating system (OS), or a non-kernel portion of an OS/server object. For example, a static ID can be used to indicate whether a system call is invoked, whether a call to the non-kernel portion of an OS/server is invoked, or whether a call to the kernel of an OS is invoked. In some instances, an address can have more than one static object ID encoded therein according to a predetermined scheme. For example, the static object IDs can be provided in an address without being limited to a particular 64-bit field of the address.

Figure 3:
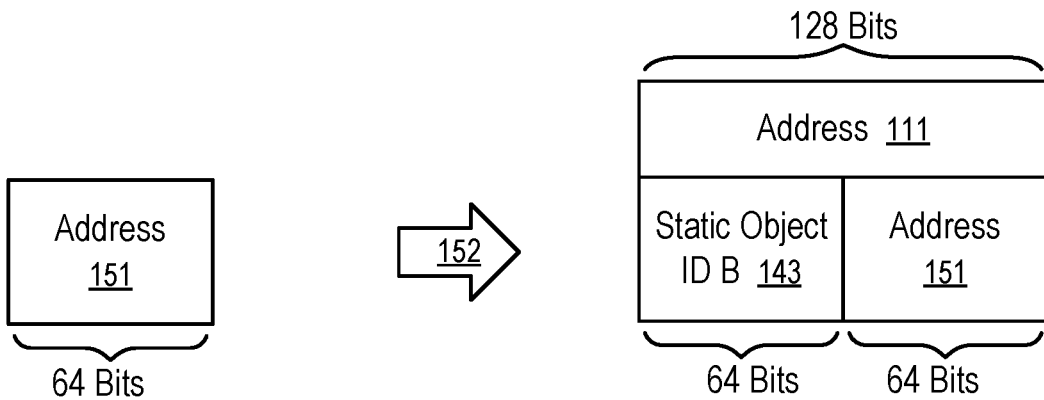
FIGS. 3 and 4 illustrate the use of static object identifications to map addresses of different address spaces.
Figure 4:
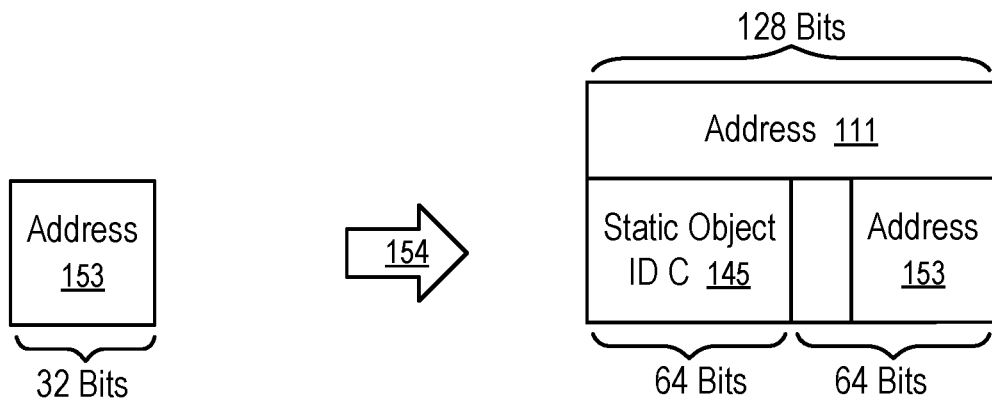

FIGS. 3 and 4 illustrate the use of static object identifications to map addresses of different address spaces.

Using the static object identifications (143 and 145), a computing system can automatically map the 64-bit address space and the 32-bit address space to the 128-bit address space according to predetermined rules. The conversion rule allows a 128-bit processor to run 64-bit applications and 32-bit applications.

For example, a 64-bit address (151) used by an application (137) programmed using 64-bit instructions (147) can be converted to a 128-bit address using the predetermined object ID (143) (e.g., a predetermined value of one (1)) for 64-bit objects, and using the 64-bit address (151) as the offset (115) in the 128-bit address (111), as illustrated in FIG. 3.

For example, a 32-bit address (153) used by an application (139) programmed using 32-bit instructions (149) can be converted to a 128-bit address using the predetermined object ID (145) (e.g., a predetermined value of two (2)) for 32-bit objects, and using the 32-bit address (153) as the offset (115) in the 128-bit address (111), as illustrated in FIG. 4.

Information provided by object identifications can be used to improve security operations of the computing system.

For example, speculative instruction execution has caused security threats in computer systems implemented using certain microprocessors, as documented by the Project Zero team at Google in the webpage at googleprojectzero.blogspot.com/2018/01/reading-privileged-memory-with-side.html, which is hereby incorporated herein by reference.

The present disclosure includes techniques of using object identification numbers in memory addresses to improve security in relation with conditional speculative instruction execution.

For example, when the processor (101) reaches a branch instruction, the processor (101) can determine whether or not to perform speculative execution of the instructions after the branch instruction based on the inspection of object ID of the instructions after the branch instruction.

For example, if the memory address associated with an instruction after the branch instruction has a static object ID (141) that represents a kernel (133) of the operating system (131), the processor (101) can prevent the speculative execution of the instructions after the branch instruction.

For example, if a memory address associated with an instruction after the branch instruction references an object different from the current object, such as the object identified by a memory address associated the branch instruction (or an instruction executed before the branch instruction), the processor (101) can prevent speculative execution of the instruction after the branch instruction.

Figure 5:
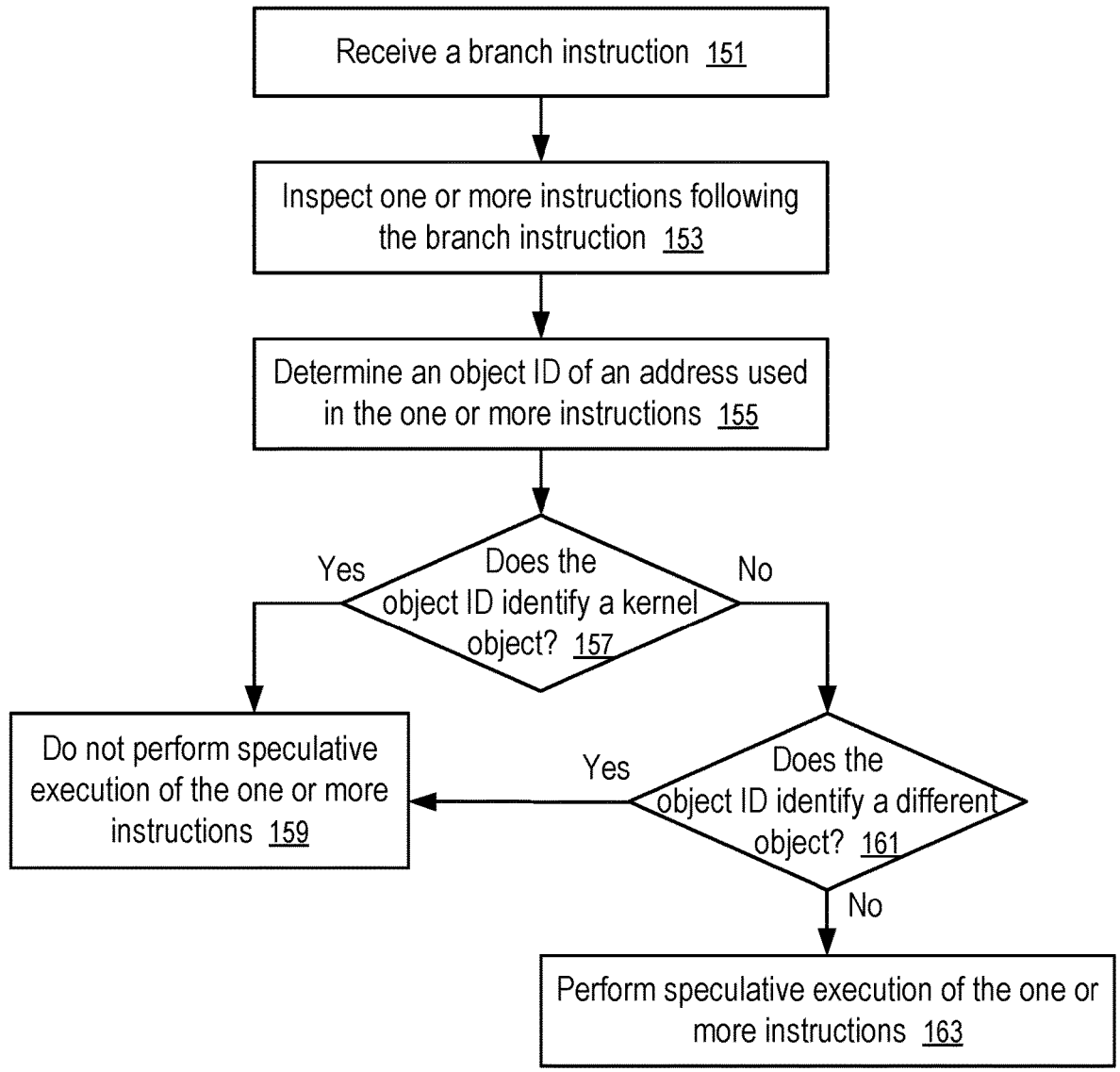
FIG. 5 shows a method to use object identifications in memory addresses to secure conditional speculative instruction execution.

FIG. 5 shows a method to use object identifications in addresses to secure conditional speculative instruction execution. The method of FIG. 5 can be implemented in a computing system of FIG. 1.

Conditional speculative instruction execution involves the execution of one or more second instructions before the results of one or more first instructions are available. When available, the results of one or more first instructions may allow the execution of the one or more second instructions, or prevent the execution of the execution of the one or more second instructions. Thus, the execution of the one or more second instructions before the results of one or more first instructions are available is speculative. If the results of one or more first instructions allow the execution of the one or more second instructions, the results of the speculative execution of the one or more second instructions can be used, which accelerate the execution of the instructions. If the results of one or more first instructions prevent the execution of the one or more second instructions, the results of the speculative execution of the one or more second instructions are discarded.

Conditional speculative instruction execution may cause security vulnerabilities. The method of FIG. 5 can improve the security of the computing system in relation with conditional speculative instruction execution.

The method of FIG. 5 includes: receiving (151) a branch instruction (or similarly a subroutine call); inspecting (153) one or more instructions following the branch instruction; determining (155) an object ID (113) of an address (111) used in the one or more instructions; and determining whether (157) the object ID identifies a kernel object.

For example, in a computer system where a static object ID (141) (e.g., a predetermined value of zero (0)) is used to identify a kernel object (133), the processor (101) can determine whether (157) the object ID identify a kernel object by comparing the object ID to the static object ID (141) (e.g., a predetermined value of zero (0)).

If (157) the object ID of an address (111) used in the one or more instructions following the branch instruction identifies a kernel object (and the current object is not a kernel object), the processor does not (159) perform speculative execution of the one or more instructions. Such an arrangement prevents attacks on the kernel of an operating system made using conditional speculative instruction execution.

Otherwise (157), the method of FIG. 5 further includes determine whether (161) the object ID identify a different object. If the object referenced by the object ID of an address (111) used in the one or more instructions following the branch instruction is different from the current object from which the branching is performed, there is a security risk; and thus, the processor (101) does not (159) perform speculative execution of the one or more instructions. In general, when the processor (101) executes a sequence of instructions in speculation that change from being addressed as one object to another object, a mediation operation can be performed to determine whether there is a security risk.

Otherwise (161), the processor (101) can be permitted to perform (163) speculative execution of the one or more instructions.

Thus, the processor (101) can prevent, avoid, or skip speculative executions into a kernel (133) of an operating system (131) and/or speculative executions into a different object (121) from a current object (123).

The method of FIG. 5 can be used to secure speculative instruction execution involving a subroutine call. Further, other conditions formulated based on object ID (e.g., static object ID) can be used to preclude speculation.

Figure 6:
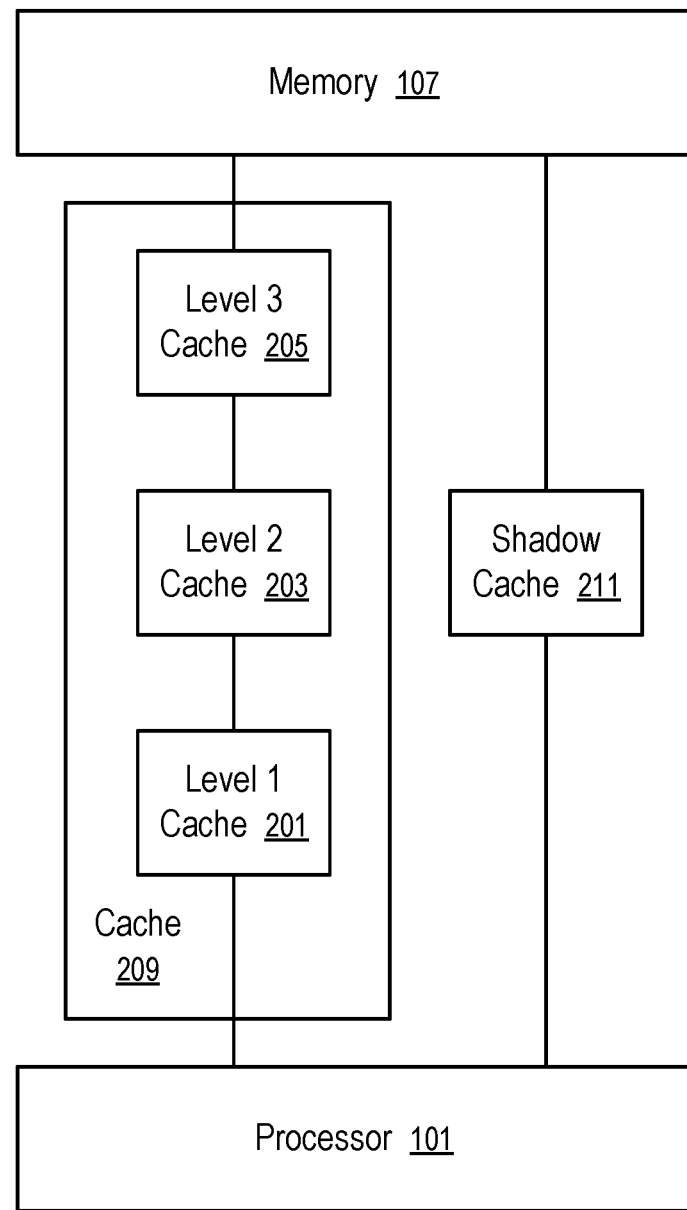
FIG. 6 shows a shadow cache used to secure conditional speculative instruction execution.

Another technique to secure speculative instruction execution includes the use of a shadow cache, as illustrated in FIG. 6. Optionally, the shadow cache technique can be used in combination with the object identification techniques discussed above.

FIG. 6 shows a shadow cache used to secure conditional speculative instruction execution.

In FIG. 6, the processor (101) uses a main cache (209) coupled between the memory (107) and the processor (101) for normal execution of instructions. For example, the main cache (209) can include a conventional Level 1 cache (201), a conventional Level 2 cache (203), and/or a conventional Level 3 cache (205).

In FIG. 6, a shadow cache (211) is provided between the memory (107) and the processor (101). The shadow cache (211) is separate from the main cache (209) and may or may not replicate the cache (209) in physical structure. In some instances, the shadow cache (211) and the main cache (209) have the same number of cache levels; and in other instances, the shadow cache (211) and the main cache (209) have different numbers of cache levels. In some instances, the shadow cache (211) and the main cache (209) have the same caching capacity; and in other instances, the shadow cache (211) and the main cache (209) have different caching capacities. Preferably, the logical structure of the shadow cache (211) is the same as the logical structure of the main cache (209). Examples of logical structure include cache attributes, such as type of associativity, write to memory strategy (e.g., write back or write through), tag size, cache block size. The caches (211 and 209) can be applied to both logical and physical associations.

To prepare the speculative execution of one or more instructions, the processor (101) can initialize the shadow cache (211) using the states obtained from the main cache (209). For example, in some instances, the shadow cache (211) mirrors the main cache (209) during normal executions of instructions, such that when the processor (101) starts to execute the one or more instructions in speculation, no further initialization is necessary. In other instances, the shadow cache (211) does not mirror the main cache (209) during normal executions of instructions; and an initialization operation is performed to take into account of the effect of the main cache (209) on the memory (107). For examples, the content of the main cache (209) can be copied to the shadow cache (211) prior to the speculative execution.

During the speculative execution of one or more instructions, the processor (101) can access the data in the memory (107) via the shadow cache (211). The effects of the speculative execution are contained within the shadow cache (211). Before it is confirmed that the instructions executed during speculative execution should be executed, the speculative execution has no effect on the main cache (209) and the memory (107). Further, access to the shadow cache (211) is limited to the speculative execution of one or more instructions. Such an arrangement prevents unauthorized data access made via the effects of speculative execution.

In FIG. 6, the speculative execution of one or more instructions in the processor (101) is blocked from changing the states of the main cache (209) and the memory (107). For example, during the speculative execution, the main cache (209) is locked from changes; and the memory (107) is accessible the shadow cache (211); and the shadow cache (211) does not permit the flushing of changes from the shadow cache (211) to the memory (107). Thus, the speculative execution of the one or more instructions in the processor (101) can be physically or administratively prohibited from changing a state of the main cache (209) and the memory (107). The speculative execution of one or more instructions in the processor (101) is allowed to change the states of the shadow cache (211).

For example, a control signal from the processor (101) can indicate whether the current memory access is a result of speculative execution. When the control signal is asserted, the shadow cache (211) is used and the main cache (209) is not used. Thus, the speculative execution has no effect on the main cache (209), but is allowed to change the shadow cache (211).

The memory (107) is not changed during the speculative execution made using the shadow cache (211). Changes made during the speculative execution of the one or more instructions are cached in the shadow cache (211). For example, a memory store instruction will be blocked from causing the data to be stored into the memory (107) during the speculative execution. The shadow cache (211) can be updated to indicate that the corresponding data in the memory (107) is out of date; and the current data in the shadow cache (211) is up to date as a result of the speculative execution made using the shadow cache (211).

If the result of the normal execution of instructions leading to the one or more instructions that are executed on speculation in the shadow cache (211) allows or requires the execution of the one or more instructions, the valid results in the shadow cache (211) can be applied to the main cache (209). Updates for the main cache (209) can occur at the same time (e.g., using a communication channel between the main cache (209) and the shadow cache (211).

For example, each cache block can have a valid bit to indicate whether the cache block contains valid data. When the result of the speculative execution is to be accepted, valid data in the shadow cache (211) resulting from the speculative execution can be identified and moved/copied to the main cache (209).

After the main cache (209) is synchronized with the shadow cache (211) to incorporate the effects of the speculative execution on the shadow cache (211), the processor (101) can be notified to perform subsequent operations using the main cache (209) that has the result of the execution of the one or more instructions previously executed on speculation using the shadow cache (211).

If the result of the normal execution of instructions leading to the one or more instructions that are execute on speculation in the shadow cache (211) prevents the execution of the one or more instructions, the speculation to execute the one or more instructions is incorrect. Thus, the results in the shadow cache (211) are invalidated (e.g., by setting the invalid bit of cache blocks in the shadow cache (211)). The shadow cache (211) can optionally be synchronized with the main cache (209) to have the content of the main cache (209), in preparation for next speculative execution. For example, the changes in the main cache (209) that have not yet been flushed to the memory (107) can be copied to the shadow cache (211).

The technique of the shadow cache (211) can also be used in a computer having shared memory multi-processors. For example, a plurality of processors/cores (e.g., 101) can share the memory (107) via a switch or a bus. Each of the processors (e.g., 101) has a main cache (209) and a shadow cache (211). The processors (e.g., 101) implement cache coherency protocol between/among the processors (e.g., 101) and their main caches (e.g., 209). In such a situation, the effect of the speculative execution by one processor (e.g., 101) is configured to be contained within the shadow cache (211) of the processor (e.g., 101), before the determination that the execution of the instructions involved in the speculative execution is allowed. There is no need for a control line from one processor (e.g., 101) to another processor to indicate speculative executing within the processor (e.g., 101).

The technique of using a shadow cache (211) to protect the main cache (209) can also be used in a similar way to protect a main stack using a shadow stack. A stack in a computing device has a memory that allows data to be added into the memory for storage and then retrieved from the memory for consumption in a last in first output manner.

The techniques disclosed herein can be applied to at least to computer systems where processors are separated from memory and processors communicate with memory and storage devices via communication buses and/or computer networks. Further, the techniques disclosed herein can be applied to computer systems in which processing capabilities are integrated within memory/storage. For example, the processing circuits, including executing units and/or registers of a typical processor, can be implemented within the integrated circuits and/or the integrated circuit packages of memory media to perform processing within a memory device. Thus, a processor (e.g., 101) as discussed above and illustrated in the drawings is not necessarily a central processing unit in the von Neumann architecture. The processor can be a unit integrated within memory to overcome the von Neumann bottleneck that limits computing performance as a result of a limit in throughput caused by latency in data moves between a central processing unit and memory configured separately according to the von Neumann architecture.

The description and drawings of the present disclosure are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications can be made thereto without departing from the broader spirit and scope as set forth in the following claims. The specification and drawings are, accordingly, to be regarded in an illustrative sense rather than a restrictive sense.

What is claimed is:

1. A computing device, comprising:
   a processor;
   a first cache coupled between a memory and the processor; and
   a second cache coupled between the memory and the processor;
   wherein the computing device is configured to:
     allocate a respective cache from the first cache and the second cache, in response a decision to execute one or more instructions;
     access the memory via the respective cache during execution of the one or more instructions, to contain effects of the execution within the respective cache.

2. The computing device of claim 1, wherein the respective cache is the second cache; and the processor is configured to assert, during the execution of the one or more instructions, a signal to block the first cache from changes.

3. The computing device of claim 2, wherein the processor is configured to block, when the signal is asserted, the second cache from updating the memory.

4. The computing device of claim 3, wherein the processor is configured to update the first cache according to the second cache, after the execution of the one or more instructions, in response to a determination that execution of the one or more instructions is to be performed.

5. The computing device of claim 3, wherein the processor is configured to receive a signal that indicates completion of updating the first cache according to the second cache before executing instructions programmed for execution following the execution of the one or more instructions.

6. The computing device of claim 3, wherein the processor is configured to update the second cache according to the first cache in response to a determination that execution of the one or more instructions is not to be performed.

7. The computing device of claim 3, wherein the processor is configured to invalidate changes in the second cache in response to a determination that execution of the one or more instructions is not required.

8. The computing device of claim 1, wherein the processor is configured to:
   access the memory via the second cache, during the execution of one or more instructions; and
   limit access to content in the second cache to the execution of the one or more instructions by the processor, during the execution of the one or more instructions.

9. The computing device of claim 8, wherein the processor is configured to prohibit changing the first cache, during the execution of the one or more instructions.

10. The computing device of claim 1, wherein the processor is configured to access content of the first cache via a cache coherency protocol.

11. A method comprising:
    executing, by a processor, a set of instructions containing first instructions and second instructions, including:
      executing, using a first cache coupled between a memory and the processor, the first instructions to evaluate a condition that determines whether to execute the second instructions; and
      executing, by the processor prior to the condition being evaluated from execution of the first instructions, the second instructions using a second cache coupled between the memory and the processor, with effects of execution of the second instructions being limited within the second cache.

12. The method of claim 11, further comprising:
determining whether the execution of the second instructions is required, after the execution of the second instructions.

13. The method of claim 12, further comprising:
applying changes made by the second instructions in the second cache to the first cache, in response to determining the execution of the second instructions is required.

14. The method of claim 12, further comprising:
invalidating content of the second cache, in response to determining the execution of the second instructions is not required.

15. The method of claim 12, wherein limiting the effects of executing the second instructions includes:
prohibiting execution of the second instructions from changing the memory while allowing the speculative execution of the second instructions to change the second cache; and
prohibiting the execution of the second instructions from changing the first cache.

16. The method of claim 15, further comprising:
prohibiting access to the second cache other than by the processor executing the second instructions.

17. A computing device, comprising:
memory;
a plurality of processors, including a first processor and a second processor; and
a plurality of sets of caches configured for the plurality of processors respectively to access the memory;
wherein the first processor in the plurality of processors is configured with access to a first cache configured for the second processor to access the memory; and
wherein the second processor is configured to be limited, during speculative execution of one or more instructions by the second processor, to access the memory via a second cache configured for the second processor and is prohibited from changing the memory via the second cache.

18. The computing device of claim 17, wherein the first processor is prohibited from accessing the second cache configured for the second processor, during the speculative execution of the one or more instructions by the second processor.

19. The computing device of claim 18, wherein after the speculative execution of the one or more instructions, changes in the second cache configured for the second processor are incorporated into the first cache configured for the second processor, in response to a determination to execute the one or more instructions.

20. The computing device of claim 19, wherein before the speculative execution of the one or more instructions, the second cache configured for the second processor is synchronized with the first cache configured for the second processor.

* * * * *